United States Patent [19]

Divins et al.

[11] Patent Number: 4,656,015

[45] Date of Patent: Apr. 7, 1987

[54] CONTINUOUS PROCESS FOR THE PRODUCTION OF POWDERED URANIUM DIOXIDE FROM URANYL NITRATE

[75] Inventors: Larry A. Divins; Harold L. Runion, both of Wilmington, N.C.

[73] Assignee: General Electric Company, San Jose, Calif.

[21] Appl. No.: 651,585

[22] Filed: Sep. 17, 1984

[51] Int. Cl.⁴ ............................................. C01G 43/025
[52] U.S. Cl. ........................................ 423/261; 423/253
[58] Field of Search ............................ 423/15, 253, 261

[56] References Cited

U.S. PATENT DOCUMENTS

| | | | |
|---|---|---|---|
| 2,466,118 | 4/1949 | Miller et al. | 423/15 |
| 3,000,698 | 9/1961 | Crowe | 423/15 |
| 3,579,311 | 5/1971 | McCoy | 423/261 |
| 3,726,650 | 4/1973 | Welty | 423/15 |
| 3,758,664 | 9/1973 | Gerrald | 423/15 |
| 3,998,925 | 12/1976 | Fuller | 423/15 |
| 4,035,468 | 7/1977 | Craigen et al. | 423/253 |
| 4,177,241 | 12/1979 | Divins et al. | 423/20 |
| 4,401,628 | 8/1983 | Chiang et al. | 423/253 |
| 4,476,101 | 10/1984 | Dugua | 423/15 |

OTHER PUBLICATIONS

R. C. Hoyt, "Precipitation Kinetics of a Continuous Precipitator with Application to the Precipitation of Ammonium Polyuranate", Apr. 1978, pp. 25 and 26 more Pertinent.

*Primary Examiner*—Edward A. Miller
*Attorney, Agent, or Firm*—Ivor J. James, Jr.; Raymond G. Simkins

[57] ABSTRACT

An improved process for producing powdered uranium dioxide from a solution of uranyl nitrate which is suitable for the manufacture of fuel for nuclear reactors. The process is continuous and comprises an incremental precipitation of soluble uranyl nitrate with ammonium hydroxide which is interrupted with an intermediate aging period. The precipitate of ammonium uranate solids is dried and thermally converted to a powdered oxide of uranium.

28 Claims, 1 Drawing Figure

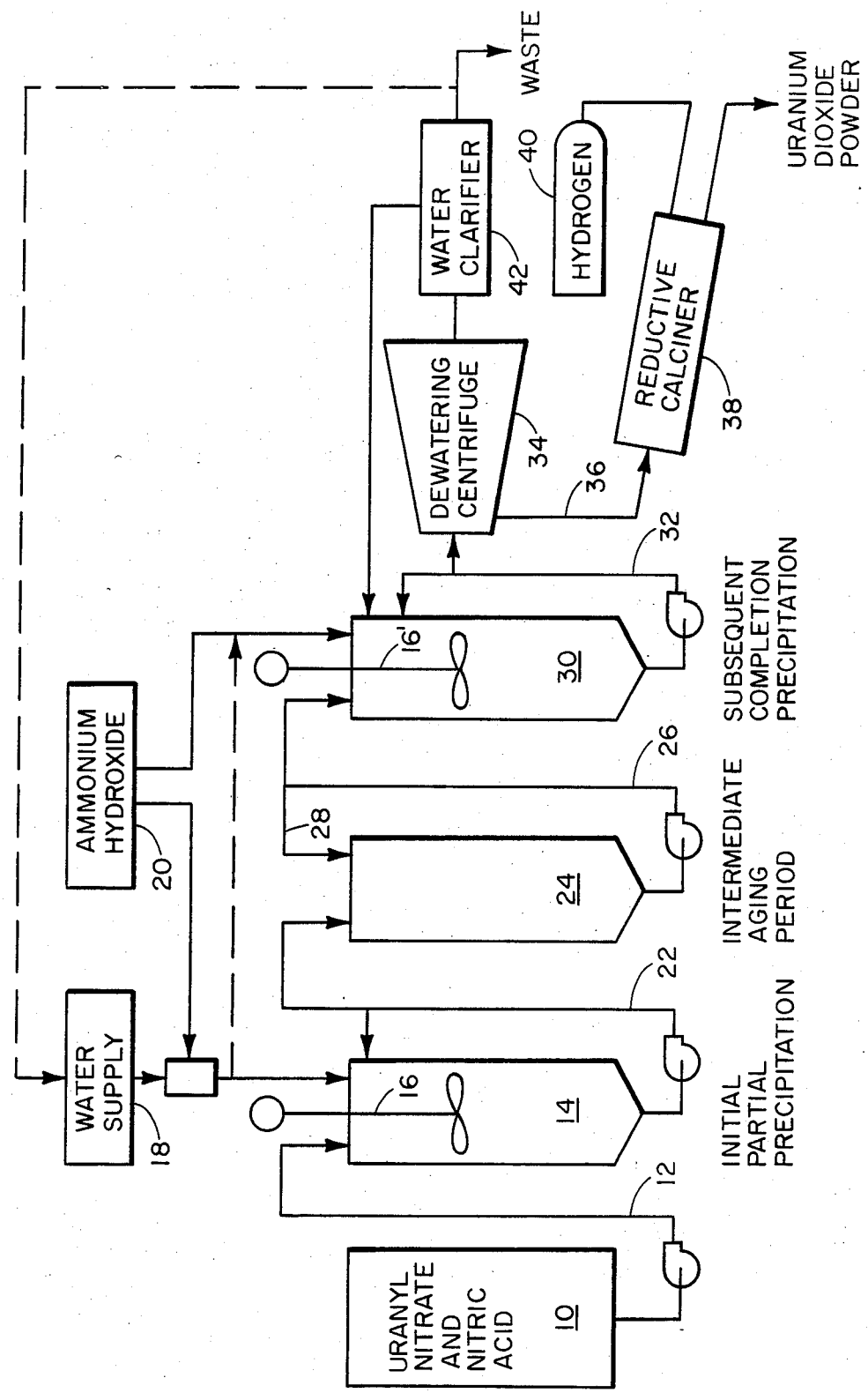

CONTINUOUS PROCESS FOR THE PRODUCTION OF POWDERED URANIUM DIOXIDE FROM URANYL NITRATE

BACKGROUND OF THE INVENTION

This invention relates to an improved procedure for recovering and recycling uranium materials, and in particular for producing uranium dioxide powder suitable for the fabrication of nuclear fuel for reactor service.

Uranium is generally reclaimed from any wastes, production or product rejects, or the like materials containing same, and recycled, if feasible, because of its high costs and possible environmental concern about its disposal otherwise.

A common means for reclaiming uranium from waste, rejects and the like sources is to contact any such uranium-containing material with nitric acid to dissolve the uranium content thereof and convert it into a soluble compound, uranyl nitrate, for extraction, separation and recovery.

One system for reclaiming uranium, in particular enriched uranium for use as nuclear fuel, employing such an acid dissolution procedure is disclosed in U.S. Pat. No. 4,177,241, issued Dec. 4, 1979 and assigned to the same assignee as the subject invention. The contents of the disclosure of this relevant background patent is incorporated herein by reference.

However, this invention is applicable to uranyl nitrate derived from the nitric acid dissolution of uranium regardless of its source, including for example tri-butyl phosphate solvent extracted uranium which has been dissolved in nitric acid as well as scrap and waste sources from nuclear fuel manufacture. The uranium can be enriched or unenriched.

SUMMARY OF THE INVENTION

This invention consists of a method for producing uranium dioxide powder which is suitable for the fabrication of nuclear fuel, and it comprises the precipitation of ammonium uranate solids from an acidic water solution containing soluble uranyl nitrate with ammonium hydroxide, the dewatering of the precipitated ammonium uranate solids and their thermal decomposition and reduction to uranium dioxide powder.

The precipitation phase of this invention is carried out continuously and in successive increments, consisting of three distinct stages including: (a) an initial step of a partial precipitation of a fraction of the soluble uranyl nitrate contents of the acidic water medium with a sub-stoichiometric quantity of ammonium hydroxide; (b) then an intermediate step of a period of aging the water medium with its partially precipitated contents; and (c) thereafter a subsequent step of concluding the precipitation wherein the remaining soluble uranyl nitrate fraction is rendered insoluble with an excess of ammonium hydroxide to complete the uranium precipitation. In the preferred embodiment of this invention, these steps are continuously effected in sequence in succeeding zones. The precipitate of ammonium uranate solids is dried and heated to drive off the ammonia to provide a powdered oxide of uranium.

OBJECTS OF THE INVENTION

It is a primary object of this invention to provide an improved process for producing uranium dioxide powder for nuclear fuel service from soluble uranyl nitrate which is not restricted to low uranium concentrations.

It is a further object of this invention to provide an effective procedure for reclaiming uranium and converting it into a suitable form for the manufacture of nuclear fuel.

It is an additional object of this invention to provide an improved continuous process for producing a stable uranium dioxide powder of advantageous properties for nuclear fuel fabrication.

It is a still further object of this invention to provide a continuous precipitation procedure for reclaiming uranium for recycling which forms a readily dewaterable ammonium uranate precipitate of relatively stable particle size distribution.

It is also an object of this invention to provide a continuous uranium recovery system operating in a water medium which reduces water consumption and lowers uranium losses to the liquid waste.

BRIEF DESCRIPTION OF THE DRAWINGS

The drawing comprises a schematic diagram comprising the improved method and system of the invention for recovering uranium in a form suitable for the fabrication of nuclear fuel.

DETAILED DESCRIPTION OF THE INVENTION

Referring to the drawing, an overall schematic of a preferred embodiment of the invention is illustrated and described hereinafter.

An aqueous solution comprising a medium of water containing soluble uranyl nitrate and nitric acid derived from a uranium recovery process such as in U.S. Pat. No. 4,177,241, is provided in storage-supply tank 10 for the continuous feeding of the solution into and through the process system and operations as set forth.

In carrying out this invention, the aqueous solution containing uranyl nitrate and nitric acid is continuously fed from storage-supply tank 10 through pipe 12 at a predetermined flow rate into reaction vessel 14, provided with agitating means such as mixer 16. Simultaneously therewith, water from supply tank 18 and ammonium hydroxide from supply tank 20 are combined to provide an ammonium hydroxide solution of relatively dilute concentration which in turn is continuously fed at a predetermined rate into reaction vessel 14. The solution of dilute ammonium hydroxide is continuously added to the reaction vessel at a ratio less than stoichiometric quantity with respect to the uranyl nitrate being continuously supplied thereto.

The continuous introduction of an acidic water solution of uranyl nitrate into the upper or surface portion of the reaction vessel 14 along with the continuous introduction of the ammonium hydroxide in sub-stoichiometric proportions results in the neutralization of any free acid and the partial, or incomplete precipitation of the uranyl nitrate content as ammonium uranate. This partial, or incomplete precipitation of the initial reaction step in vessel 14 should be to the degree of converting a significant fractional portion of about 30 to about 95 percent of the soluble uranyl nitrate contents of the aqueous medium to insoluble ammonium uranate. Thus the concentrations and quantities of the active ingredients including the uranyl nitrate with any acid and ammonium hydroxide reactant continuously fed into the initial reaction vessel 14 should be appropriately gauged to achieve such a proportional reaction at the first stage of the process precipitation reaction. Product characteristics depend upon the degree of the initial precipitation, and thus can be controlled. The higher the proportion of uranium initially precipitated, the greater the agglomeration of particles into larger sized bodies. Preferably to produce a more reactive or higher density powder, the initial precipitation is sufficient to convert about 30 to about 60 percent of the soluble uranyl nitrate contents to ammonium uranate solids.

The uranyl nitrate and ammonium hydroxide reactants continuously supplied into reaction vessel 14 are preferably rapidly and uniformly interdispersed upon their separate introduction into the upper region of the vessel contents with a suitable mixing means 16 such as a revolving blade impeller. This mode of introduction coupled with mixing facilitate the rate of completion of the initial partial reaction between said ingredients and avoids excessive nucleation at the feed points. The precipitation reaction may also be accomplished in other well mixed regions, e.g. at the inlet to the recirculation pump for vessel 14.

In a preferred embodiment of this invention, the aqueous solution of uranyl nitrate and nitric acid for processing is adjusted to a range of uranium concentration of about 100 to about 250 grams per liter, optimally about 175 grams per liter, with a free nitric acid concentration in range of about 0.05 to about 1.5 molar, optimally about 0.15 molar. The ammonium hydroxide added thereto for the initial and partial precipitation in vessel 14 is diluted to about 1 to about 2 molar, optimally about 1.5 molar, in the concentration of aqueous ammonia.

This initial stage of the partial precipitation reaction between the continuously supplied soluble uranyl nitrate and continuously supplied ammonium hydroxide into vessel 14 is preferably effected continuously at the upper or surface portion of the body of the aqueous medium contained in vessel 14 within an agitated area, and at reaction residence times of relatively short durations.

The initial, partial precipitation reaction can be controlled by maintaining the mole ratio of ammonia (NH$_3$) to uranium (U) at about 0.8 to about 2.2 to 1 (optimally about 0.9–1.3:1), with the extra addition of the stoichiometric quantity of ammonia required to neutralize any free nitric acid contents of the aqueous solution. Also, the temperature of the water medium in vessel 14 is maintained in a range of from about 35° C. (95° F.) to about 70° C. (158° F.) in the preferred embodiment to enhance the reaction. Temperature, uranium concentration, and residence time affect the mole ratio of ammonia to uranium required to give a particular degree of precipitation.

The first stage or increment of the procedure of this invention comprising the incomplete reaction of a partial precipitation of the uranium contents of the aqueous solution is in accordance with the following typical equations:

$$HNO_3 + NH_4OH \rightarrow NH_4NO_3 + H_2O \quad (1)$$

$$UO_2(NO_3)_2 + 2NH_4OH \rightarrow UO_2(OH)_2 + 2NH_4NO_3 \quad (2)$$

The next or second stage of this invention comprises an aging period, which is effected intermediate the initial partial and subsequent completion precipitation increments of the procedure by retention in a holding vessel 24.

In the intermediate aging stage, the water medium containing the reactants or their products of the partial precipitation and other components in reaction vessel 14 is continuously transferred therefrom at a predetermined rate through pipe 22 into holding vessel 24 provided with recirculating means. In vessel 24 the aqueous medium with its contents are retained and recirculated through a loop provided by pipes 26 and 28 at a flow rate greater than the settling rate of the precipitated solid contents thereof to avoid their separation and solid sedimentation. The flow of the aqueous medium with its contents continuously through the overall system, comprising the sequence of vessels and their volumes for effecting the incremental precipitations and intermediate aging, should be gauged to provide for a retention of the ingredients of the aqueous medium for a period of at least about 10 minutes between effecting the initial partial precipitation and the subsequent completion of the precipitation of the uranium by the incremental introduction of ammonium hydroxide. This retention or holding period can range from the minimum of about 10 minutes up to about 45 minutes or longer.

Since the aqueous medium and its contents are continuously moving through components of the system, the holding period for aging between the incremental precipitation steps is an overall mean residence time.

The holding period enables optimum growth and agglomeration of the precipitated particles of ammonium uranate, and it appears that a small amount of the remaining soluble uranium crystallizes on the surface of the precipitated particles as the aqueous medium and its contents cool and age. This essentially reaction-free period contributes to the degree of integrity of the precipitated particles and their stability. The period also permits the partial precipitation reaction to stabliize.

Upon completing of at least about 10 minutes average mean residence time for aging, the aqueous medium and its contents are continuously transferred from holding vessel 24 at a predetermined rate through pipe 26 into reaction vessel 30 for completion of the precipitation of the remaining soluble uranyl nitrate with ammonium hydroxide to ammonium uranate solids.

Ammonium hydroxide solution from supply tank 20 is continuously fed into reaction vessel 30 along with the aqueous medium and its contents from holding vessel 24 in such amounts and concentration to provide for the completion of the precipitation of the unreacted uranyl nitrate. The ammonium hydroxide solution is introduced into vessel 30 in the form of about 1 to 15 molar concentration of aqueous ammonia, and in excess of stoichiometric proportions to incur completion of the precipitation of all uranyl nitrate as ammonium uranate solids. The use of concentrated ammonium hydroxide, namely about 10 to 15 molar ammonia, is preferred to minimize water consumption.

In the third stage of the procedure of this invention, or subsequent incremental precipitation completing the reaction of uranium solidification, the following typical equations define the chemistry:

$$UO_2(OH)_2 + NH_4OH \rightarrow NH_4UO_3(OH) + H_2O \quad (3)$$

$$NH_4UO_3(OH) + NH_4OH \rightarrow (NH_4)_2UO_4 + H_2O \quad (4)$$

In the preferred embodiment, this latter reaction is controlled at a pH of between about 6.0 and about 9.0, and optimally about 7.0 pH. Also, the reaction is carried out at a temperature in the range of about 35° C. (95° F.) to about 70° C. (158° F.).

The final pH affects the product particle size distribution. A higher pH, e.g. 9.0, generally produces smaller agglomerates.

The subsequent and completing precipitation reaction in vessel 30 is also essentially effected continuously at the upper or surface portion of the body of the aqueous medium contents of the vessel. Vessel 30 can be provided with a mixer 16' to facilitate the reaction.

A variation to the precise control of the partial precipitation of uranium required in the first stage is to split the feed uranyl nitrate with a predetermined fraction supplied to the first stage and the remainder supplied to the third or final stage. The first stage uranyl nitrate still must undergo a partial precipitation but this can be more loosely controlled between 30 and about 95 percent.

The ammonium uranate solids produced by the incremental precipitation operation in the reactor vessels 14 and 30 is then transferred as a water slurry of the solids suspended in the aqueous medium continuously at a predetermined rate through pipe 32 into a dewatering centrifuge 34 wherein the water content entrained with the granular solids is rapidly reduced to about 40 to about 60 percent by weight of the solids. At this water content the granular solids are paste-like in consistency, and it is transferred through pipe 36 to a kiln 38 which is preferably of the conventional rotary type for further drying and thermal conversion by calcination.

The granules of the ammonium uranate compound and the water entrained therein are calcined within the kiln 38 in a reducing atmosphere to remove the remaining water, thermally decompose the compound to an oxide of uranium, drive off the freed ammonia and reduce the uranium oxide to uranium dioxide. Although other reducing agents can suffice in this operation, hydrogen gas from an apt supply 40 is usually preferred. This conversion is illustrated by the typical equations:

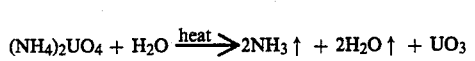
(5)

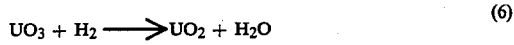
(6)

Water extracted from the slurry in dewatering centrifuge 34 can be further cleansed in a second clarifying unit 42 such as a second centrifuge or filter, and recycled or discharged to waste. Moreover, because of the approximately neutral state of the water emerging from the completed process (pH of about 7 to 8), and negligible uranium content, it can safely be discharged into common waste disposal units.

The process of this invention produces about 13 liters of waste water per kilogram of uranium without considering the potential for recycling a portion of the water. Waste water generation is relatively low for such procedures.

The continuous incremented precipitation and intermediate aging procedure of this invention produces granular ammonium uranate particles with a coating of fine ammonium uranate crystals which easily dewater and are of a controlled particle size distribution. Moreover, the particle characteristics are carried through to the uranium dioxide powder produced therefrom and provide excellent properties for subsequent ceramic processing such as compressing into pellets. The coating of fine crystals serves to bind particles and to fill voids when the powdered uranium dioxide is pressed into pellets.

EXAMPLE

A uranyl nitrate feed containing 175 grams uranium per liter and 0.15M nitric acid is applied at a continuous flow rate of 50 kilograms of uranium per hour, while 285.7 liters per hour of the uranyl nitrate solution is reacted with 156.0 liters per hour of 1.5M ammonium hydroxide in the first stage. The reaction is exothermic and generates some heat but not in an amount sufficient to heat the reaction to the desired 50° C. range. The reactants are thus heated to produce reaction conditions of 50° C. At these flow rates the ammonia to uranium mole ratio in the first stage is 0.91 after taking into account nitric acid neutralization. Under these conditions 38% of the uranium is precipitated and the resultant pH is 3.35. The precipitate formed is composed of crystalline, granular particles of 1 to 20 micron size.

Residence time in the aging stage is about 30 minutes with the temperature held close to the first stage temperature. During the aging time the first stage precipitated solids stabilize. In the final precipitation stage 26.0 liters per hour of concentrated ammonia (20 weight percent ammonia or 10.8M NH$_3$) is reacted with the aged solution to precipitate the remaining soluble uranium. The observed pH is 7.2. The overall ammonia to uranium mole ratio for both precipitation stages is 2.25 which is substantially less than the ratio of 4.0 required for the sum of equations (2), (3) and (4). In a continuous precipitation process with practical reaction residence times of relatively short durations, the uranium precipitation reactions apparently do not achieve equilibrium but only a steady state condition. The precipitate after the final stage is crystalline, granular particles typically of 1 to 5 micron size. These particles are unlike the prior art where it is said that ammonium uranates produced from uranyl nitrate are composed of amorphous, cohesive particles whose diameter is 0.05 to 2 microns and which are difficult to dewater.

After the solids are readily separated from the aqueous solution, preferably by a centrifugal separator, the waste liquid contains 5-10 PPM uranium before any treatment to further recover the uranium. The uranium level in the waste stream by the procedures of this invention are greatly reduced when compared with the procedures outlined in the prior art. In this example the total liquid volume employed is 9.35 liters per kilogram of uranium without reuse of the waste solution as dilution water for the first stage ammonium hydroxide. This volume of liquid is one-fourth to one-fifth of the volume reported in the prior art.

Under conditions similar to this example ammonium uranate solids were produced, dried and thermally converted by hydrogen reduction to uranium dioxide powder. After a brief, high speed milling step to break up the aggregates formed in the calciner and a granulation step, the powder had a bulk density of 2.6 grams/cc and had excellent flowability and compressibility. The powder was pressed into pellets under standard ram pressures of 10,000 to 30,000 psi. Compacted densities ranged from 5.3 to 5.9 grams/cc. After sintering in hydrogen at standard temperatures from 1600° C. to 1800° C., the pellets had typical densities ranging from 95 to 97% of theoretical density. The pellets had excellent characteristics for strength and homogeneity and were free of open porosity defects. The uniformity of pellet production exceeded the previous practice for conversion of uranyl nitrate to uranium dioxide.

What is claimed is:

1. A method of producing uranium dioxide powder for the fabrication of nuclear fuel from acidic solutions containing uranyl nitrate, comprising the sequence of steps of:
   (a) continuously reacting an acidic aqueous solution of uranyl nitrate with ammonium hydroxide added in less than stoichiometric amount for complete uranium precipitation, neutralizing any free acid and precipitating a portion of the uranium content of the solution as ammonium uranate solids;
   (b) continuously aging the product resulting from reacting the uranyl nitrate of the solution with less than a stoichiometric amount of ammonium hydroxide, including the precipitated ammonium uranate solids while maintaining said solids substantially suspended in the medium of the aqueous solution;
   (c) thereafter continuously reacting the aged product comprising uranyl nitrate and precipitated ammonium uranate with additional added ammonium hydroxide in amount at least sufficient to complete the preciptitation of the uranium of the solution as ammonium uranate solids;
   (d) dewatering said precipitated ammonium uranate solids; and
   (e) calcining said dewatered ammonium uranate solids in a reducing atmosphere and thereby converting said ammonium uranate to uranium dioxide powder.

2. The method of claim 1, wherin the product resulting from continuously reacting the uranyl nitrate of the solution with less than a stoichiometric amount of added ammonium hydroxide is aged for a period of at least about 10 minutes.

3. The method of claim 1, wherin the amount of added ammonium hydroxide less than stoichiometry for complete uranium precipitation first reacted with the uranyl nitrate of the solution is an amount sufficient to precipitate about 30 to 95% portion of the uranyl nitrate content of the solution.

4. The method of claim 1, wherein precipitating and aging of the solution containing uranyl nitrate and precipitated ammonium uranate are carried out with the reactants at a temperature of about 35° to about 70° C.

5. A method of producing uranium dioxide powder for the fabrication of nuclear fuel from an acidic aqueous medium containing uranyl nitrate in solution, comprising the sequence of steps of:
   (a) continuously reacting an acidic aqueous medium containing uranyl nitrate in solution with added ammonium hydroxide in amount to neutralize any free acid and to precipitate about 30 to 90% of the uranyl nitrate content of the solution as ammonium uranate solids;
   (b) continuously aging the product resulting from reacting the uranyl nitrate of the solution with the ammonium hydroxide comprising the aqueous medium with its contents including the precipitated ammonium uranate solids for a period of at least about 10 minutes while maintaining said precipitated solids substantially suspended in the aqueous medium;
   (c) thereafter continuously reacting the aged product comprising the aqueous medium containing uranyl nitrate in solution and precipitated ammonium uranate solids with additional added ammonium hydroxide in amount at least sufficient to complete the precipitation of the uranyl nitrate content of the aqueous medium as ammonium uranate solids;
   (d) dewatering said precipitated ammonium uranate solids; and
   (e) calcining said dewatered ammonium uranate solids in a reducing atmosphere and thereby converting said ammonium uranate dioxide powder.

6. The method of claim 5, wherein the product resulting from continuously reacting the uranyl nitrate of the solution with ammonium hydroxide comprising the aqueous medium with its contents including the precipitated ammonium uranate solids is aged for a period of about 10 to about 45 minutes.

7. The method of claim 5, wherein the amount of added ammonium hydroxide initially reacted with the uranyl nitrate in the acidic aqueous medium is in amount to precipitate about 30 to about 60% of the uranyl nitrate content of the solution as ammonium uranate solids.

8. The method of claim 5, wherein the precipitating and aging are carried out with the reactants at a temperature of about 35° to about 70° C.

9. The method of claim 5, wherein the added ammonium hydroxide initially reacted with the uranyl nitrate in solution in the acidic aqueous medium is about 1 to about 2 molar in the concentration of aqueous ammonia, and the added ammonium hydroxide reacted with the aged product is about 1 to about 15 molar in the concentration of aqueous ammonia.

10. The method of claim 5, wherein the initial partial precipitating reaction and the subsequent completing precipitating reaction are each substantially effected within an agitated area of the aqueous medium.

11. The method of claim 5, wherein the aqueous medium with its contents is agitated during its period of aging.

12. A method of producing a uranium dioxide powder for the fabrication of nuclear fuel from an acidic aqueous medium containing uranyl nitrate in solution, comprising the sequence of steps of:
   (a) in an initial reaction zone continuously reacting soluble uranyl nitrate in an acidic aqueous medium with ammonium hydroxide added in amount sufficient to neutralize any free acid and precipitate about 30 to 95% of the soluble uranyl nitrate content of the solution as ammonium uranate solids;
   (b) in an intermediate zone continuously aging the product resulting from reacting the soluble uranyl nitrate of the solution with the added ammonium hydroxide in the acidic aqueous medium including the precipitated ammonium uranate solids for a period of at least about 10 minutes while maintaining said precipitated solids substantially suspended in the aqueous medium;
   (c) in a subsequent reaction zone continuously reacting the aged product comprising the aqueous medium containing soluble uranyl nitrate and precipitated ammonium uranate solids with additional added ammonium hydroxide in amount in excess of that needed to complete the precipitation of the uranium content of the aqueous medium as ammonium uranate solids;
   (d) dewatering said precipitated ammonium uranate solids; and
   (e) calcining said dewatered ammonium uranate solids in a reducing atmosphere and thereby converting said ammonium uranate to uranium dioxide powder.

13. The method of claim 12, wherein the product resulting from continuously reacting the soluble uranyl nitrate of the solution with the ammonium hydroxide added in the initial reaction zone, comprising the aqueous medium with its contents including the precipitated ammonium uranate solids, is aged for a period of about 10 to about 45 minutes.

14. The method of claim 12, wherein the amount of ammonium hydroxide added and reacted in the initial reaction zone with the soluble uranyl nitrate of the acidic aqueous medium is in amount to precipitate about 30 to about 60% of the soluble uranyl nitrate content as ammonium uranate solids.

15. The method of claim 12, wherein the precipitation and aging are carried out with the aqueous medium at a temperature of about 35° to about 70° C.

16. The method of claim 12, wherein the ammonium hydroxide initially added and reacted with the soluble uranyl nitrate in the acidic aqueous medium is about 1 to about 2 molar in the concentration of aqueous ammonia, and the ammonium hydroxide added and reacted with the aged product is about 1 to about 15 molar in the concentration of aqueous ammonia.

17. The method of claim 12, wherein the initial partial precipitation reaction and the subsequent completing precipitation reaction are each substantially effected in an agitated area of the aqueous medium at the surface portion of the body of the aqueous medium.

18. The method of claim 12, wherein the aqueous medium with its contents is agitated in the intermediate zone during its period of aging.

19. A method of producing a uranium dioxide powder for the fabrication of nuclear fuel from an acidic aqueous medium containing uranyl nitrate in solution, comprising the sequence of steps of:
(a) continuously supplying soluble uranyl nitrate in an acidic aqueous medium into an initial reaction zone and thereon reacting same with ammonium hydroxide added in amount sufficient to neutralize any free acid and precipitate about 30 to 95% of the soluble uranyl nitrate content of the aqueous medium as ammonium uranate solids;
(b) continuously transferring the product resulting from reacting the soluble uranyl nitrate of the aqueous medium with the ammonium hydroxide added in the acidic aqueous medium including the precipitated ammonium uranate solids into an intermediate zone and therein aging said product for an overall means resident period of at least about 10 minutes while maintaining said precipitated solids substantially suspended in the aqueous medium;
(c) continuously transferring the aged product comprising the aqueous medium containing soluble uranyl nitrate and the precipitated ammonium nitrate solids into a subsequent reaction zone and therein reacting said aged product with additional added ammonium hydroxide in amount in excess of that needed to complete the precipitation of the soluble uranyl nitrate content of the aqueous medium as ammonium uranate solids;
(d) dewatering said precipitated ammonium uranate solids; and
(e) calcining said dewatered ammonium uranate solids in a reducing atmosphere and thereby converting said ammonium uranate to uranium dioxide powder.

20. The method of claim 19, wherein the product resulting from continuously reacting the soluble uranyl nitrate of the aqueous medium with the ammonium hydroxide added in the initial reaction zone, comprising the aqueous medium with its contents including the precipitated ammonium uranate solids, is aged for an overall mean resident period of about 10 to about 45 minutes.

21. The method of claim 19, wherein the amount of ammonium hydroxide added and reacted in the initial reaction zone with the soluble uranyl initiate of the acidic aqueous medium is in amount to precipitate about 30 to 60% of the soluble uranyl nitrate as ammonium uranate solids.

22. The method of claim 19, wherein the precipitation and aging are carried out with the aqueous medium at a temperature of about 35° to about 70° C.

23. The method of claim 19, wherein the ammonium hydroxide initially added and reacted with the soluble uranyl nitrate in the acidic aqueous medium is about 1 to about 2 molar in the concentration of aqueous ammonia, and the ammonium hydroxide added and reacted with the aged product is about 1 to 15 molar in the concentration of aqueous ammonia.

24. The method of claim 19, wherein the reaction of aged product with ammonium hydroxide is controlled by pH to produce a desired particle size distribution.

25. The method of claim 19, wherein the initial partial precipitation reaction and the subsequent completing precipitation reaction are each substantially effected in an agitated area of the aqueous medium at the surface portion of the body at the aqueous medium.

26. The method of claim 19, wherein the aqueous medium with its contents is agitated during its period of aging in the intermediate zone.

27. A method of producing a uranium dioxide powder for the fabrication of nuclear fuel bodies from an acidic aqueous medium containing uranyl nitrate in solution, comprising the sequence of steps of:
(a) continuously supplying soluble uranyl nitrate in an acidic aqueous medium into an initial reaction zone and therein reacting same with ammonium hydroxide added in amount sufficient to neutralize any free acid and precipitate about 30 to about 60% of the soluble uranium content of the aqueous medium as ammonium uranate solids;
(b) continuously transferring the product resulting from reacting the soluble uranyl nitrate of the aqueous medium with the ammonium hydroxide added in the acidic aqueous medium including the precipitated ammonium uranate solids into an intermediate zone and thereon aging said product for an overall mean resident period of about 10 to about 45 minutes while maintaining said precipitated solids substantially suspended in the aqueous medium;
(c) continuously transferring the aged product comprising the aqueous medium containing soluble uranyl nitrate and the precipitated ammonium nitrate solids into a subsequent reaction zone and therein reacting said aged product with additional added ammonium hydroxide in amount in excess of that needed to complete the precipitation of the soluble uranyl nitrate content of the aqueous medium as ammonium uranate solids;
(d) dewatering said precipitated ammonium uranate solids; and (e) calcining said dewatered ammonium solids in a hydrogen atmosphere and thereby converting said ammonium uranate solids to uranium dioxide powder.

28. A method of producing uranium dioxide powder for the fabrication of nuclear fuel from an acidic aqueous medium containing uranyl nitrate in solution, comprising the sequence of steps of:
(a) separating the uranyl nitrate into two fractions whereby about 30 to 95% of the uranyl nitrate is continuously supplied to an initial reaction zone and the remaining about 5 to 70% of the uranyl nitrate is continuously supplied to a second reaction zone;
(b) in an initial reaction zone continuously reacting the first fraction of soluble uranyl nitrate in an acidic aqueous medium with ammonium hydroxide added in amount sufficient to neutralize any free acid and precipitate about 30 to 95% of the soluble uranyl nitrate content as ammonium uranate solids;
(c) in an intermediate zone continuously aging the product resulting from reacting the soluble uranyl nitrate with the ammonium hydroxide added in the acidic aqueous medium including the precipitated solids for a period of at least about 10 minutes while maintaining said precipitated solids substantially suspended in the aqueous medium;
(d) in a subsequent reaction zone continuously reacting the aged product comprising the aqueous medium containing soluble uranyl nitrate and precipitated ammonium uranate solids and the remaining fraction of feed uranyl nitrate with additional added ammonium hydroxide in amount in excess of that needed to complete the precipitation of the uranium content of the aqueous medium as ammonium uranate solids;
(e) dewatering said precipitated ammonium uranate solids; and
(f) calcining said dewatered ammonium uranate solids in a reducing atmosphere and thereby converting said ammonium uranate to uranium dioxide powder.

* * * * *